United States Patent [19]

Dissett

[11] Patent Number: 5,715,733

[45] Date of Patent: Feb. 10, 1998

[54] LOCKING DIFFERENTIAL INCLUDING A SPRING CAP BIASING ASSEMBLY

[75] Inventor: Walter L. Dissett, Farmington Hills, Mich.

[73] Assignee: Tractech Inc., Warren, Mich.

[21] Appl. No.: 754,170

[22] Filed: Nov. 25, 1996

[51] Int. Cl.$^6$ ..................................................... F16H 48/12
[52] U.S. Cl. ..................................................... 74/650
[58] Field of Search ................................................ 74/650

[56] References Cited

U.S. PATENT DOCUMENTS

| 2,555,044 | 5/1951 | Lewis . |
| 3,507,486 | 4/1970 | Schwaller . |
| 4,498,355 | 2/1985 | Schou . |
| 4,640,143 | 2/1987 | Schou . |
| 5,413,015 | 5/1995 | Zentmyer . |

FOREIGN PATENT DOCUMENTS

| 576907 | 5/1933 | Germany . |
| 1257372 | 1/1968 | Japan . |

OTHER PUBLICATIONS

Lock Right Power Trax Installation Manual 1993 Power Trax Div. of Vehicular Technologies Corp.
All-Trac Automatic Positive-Locking Differential For the Dodge Power Wagon, Industrial Products Co., 1–86.
L.A. Locker Automatic Locking Differential For the Suzuki Samurai 1989 Industrial Products Company.
Installation Procedures (Detroit E–Z Locker).
Detroit e-z Locker Owners Manual, with Installation Procedures, Tractech.

*Primary Examiner*—Dirk Wright
*Attorney, Agent, or Firm*—Laubscher & Laubscher

[57] ABSTRACT

A locking differential includes a plurality of spring biasing assemblies each consisting solely of a helical spring having a spring cap member mounted on one end thereof for isolating the spring from the associated locking pin that extends at one end within the oversized spring bore. The spring cap member has a disc portion the outer diameter of which is at least as great as the outer diameter of the helical spring, and a central plug portion that extends within the spring, whereby the spring bears at one end solely against the cap disc portion and is isolated thereby from the locking pin. The diameter of the cap disc portion is also less than the width of a radially extending access opening that communicates with the oversized spring bore contained in a clutch member, thereby to permit introduction of the spring with the cap mounted thereon into the spring bore via the spring access opening.

4 Claims, 7 Drawing Sheets

PRIOR ART

PRIOR ART

FIG. 3

PRIOR ART

FIG. 4

PRIOR ART

LOCKING DIFFERENTIAL INCLUDING A SPRING CAP BIASING ASSEMBLY

STATEMENT OF THE INVENTION

This invention relates to a locking differential including a pair of collinearly arranged clutch members connected by locking pin means for limited angular relative displacement, and a plurality of biasing assemblies for biasing the annular clutch members axially apart toward engaged positions relative to the associated side gears, each of the biasing assemblies consisting of a helical spring arranged collinearly relative to and axially spaced from an associated locking pin, and a spring cap member mounted on the end of the spring adjacent the locking pin for isolating the spring from the locking pin.

BACKGROUND OF THE INVENTION

BRIEF DESCRIPTION OF THE PRIOR ART

Locking differentials for connecting the drive shaft of a vehicle with a pair of driven shafts or axled are well known in the patented prior art, as evidenced by the prior U.S. Pat. No. 2,555,044, Schou U.S. Pat. Nos. 4,498,355 and 4,640,143, and Zentmyer U.S. Pat. No. 5,413,015. In these known locking differentials, a drive rod extends diametrically between the clutch or coupler members in diametrically arranged oversized drive grooves or recesses contained in the adjacent faces of the clutch members, the ends of the drive rod being connected with the differential casing. The annular clutch members are spring-biased apart toward engaged positions relative to side gears that are splined on the driven shafts, relative angular displacement of the clutch members being permitted by means of locking pins that extend axially from one clutch member into oversized bores contained in the opposed face of the other clutch member. Normally the output shafts are driven at the same rotational velocity by the drive shaft via the differential casing, the drive rod, the clutch members, and the side gears. When one output shaft overruns the other (as, for example, when the vehicle is making a turn), the overrunning shaft causes the associated clutch member to speed up relative to the drive rod and to be disengaged therefrom, and owing to the configuration of the gear teeth of the overrunning side gear and the overrunning clutch member, these members disengage to cause the overrunning shaft to be in a free-wheeling condition. When the turn is completed and the output shafts again have the same rotational velocity, both clutch members are again engaged and driven by the drive rod, and the previously overrunning coupling member and the associated side gear are returned to the engaged condition.

In the ALL-TRAC and LOCK-RIGHT locking differentials introduced by Industrial Products Company in the late 1980's for use as conversion kits for off-road four-wheel-drive vehicles, the biasing means for biasing the clutch members apart included a plurality of biasing assemblies each having a planar washer or disc positioned between a collinearly arranged helical biasing spring and the associated locking pin. This washer or disc served to isolate the end of the spring from the pin, so that when the spring and the pin were relatively laterally displaced during operation of the locking differential in an overrunning condition, the adjacent ends of the pin and the spring would slide relative to the disc arranged therebetween, and the end of the pin would not engage and be hung up by the adjacent end turn of the spring. During the manual assembly of these differentials, it was customary to apply a dab of grease to the disc and adjacent end of the spring, thereby to "glue" the disc to the spring. Owing to the relatively small size of the disc (which often has a diameter on the order of ¼ inch or so) and the manual dexterity required to assemble the small springs and discs in the limited space between the clutch members, the disc was often dropped, and owing to its greasy condition, was very difficult to pick up and clean for reassembly. To alleviate this problem, in 1993 Vehicular Technologies Corporation (successor to Industrial Products Company), introduced the improved two-concentric-spring biasing arrangement shown in the Zentmyer U.S. Pat. No. 5,413,015, wherein the spring disc of the prior art was replaced by a second spring arranged concentrically within the prior biasing spring. Since the spring disc was eliminated, both the inner and outer springs were in direct bearing engagement with the adjacent end of the associated locking pin, the inner spring serving to "fill the hole" in the outer spring and thereby prevent the end of the pin from being hung up by the adjacent end turn of the outer spring. The inner spring also served as a back-up spring in case the outer spring were to break. In this two-concentric-spring embodiment, radially-extending access openings were provided in the clutch members to provide access to the springs and to the associated locking pins. The spring access openings were of such a size as to permit lateral introduction of the two loosely arranged concentric springs within the corresponding oversized spring bore, and the pin access opening afforded means for manually displacing the locking pin longitudinally by means of a pick or other sharp object during assembly or disassembly of the differential. One drawback of this two-concentric-spring differential was the manual dexterity required in installing the loosely arranged spring pair through the spring access opening, since the inner spring limited the bending flexibility of the outer spring. Furthermore, since the two concentric springs were loosely arranged, the possibility existed of dropping one or more of the relatively small springs during the retrofit assembly of the differential within a consumer's existing casing, or of losing one of the springs during the unpacking of the packaged various loose components of the differential kit prior to assembly and installation.

It is also know in the art, as evidenced by the Schwaller U.S. Pat. No. 3,507,486, to provide buttons or cap members at the ends of helical springs, thereby to support the spring ends for engagement with an adjacent component. The present invention was developed to provide an improved spring biasing arrangement for a locking differential, wherein each spring biasing assembly consists of a single helical spring having a spring cap mounted on one end thereof prior to introduction of the assembly into the spring bore via a lateral access opening contained in the clutch member, thereby to simplify the assembly of the retrofit locking differential within a consumer's existing differential casing, and to reduce the manufacturing cost of the differential.

SUMMARY OF THE INVENTION

Accordingly, a primary object of the present invention is to provide a locking differential including a plurality of spring biasing assemblies each consisting of a helical spring having a spring cap mounted on one end thereof for bearing engagement with an associated locking pin that extends at one end within the oversized spring bore, the outer diameter of the disc portion of the spring cap being greater than the outer diameter of the spring, whereby the spring bears solely against the spring cap disc portion and is isolated thereby from the pin. Furthermore, the diameter of the spring cap disc portion is less than the width of the spring access opening contained in the outer periphery of the annular clutch member, thereby to permit the lateral introduction of the spring and cap assembly cap-end-first within the spring bore between the adjacent end of the locking pin and the bottom of the spring bore.

According to a more specific object of the invention, the spring cap includes an integral central plug portion that extends concentrically within the adjacent end of the spring, preferably with a friction fit between the outer circumference of the plug portion and the inner periphery of the spring. In the preferred embodiment, the plug portion of the spring cap is tapered with the diameter thereof decreasing in the direction away from the disc portion of the spring cap member. In a second embodiment, the spring cap plug portion has the configuration of a right cylinder.

BRIEF DESCRIPTION OF THE DRAWING

Other objects and advantages of the invention will become apparent from a study of the following specification when viewed in the light of the accompanying drawings, in which.

DETAILED DESCRIPTION

Figure 1:
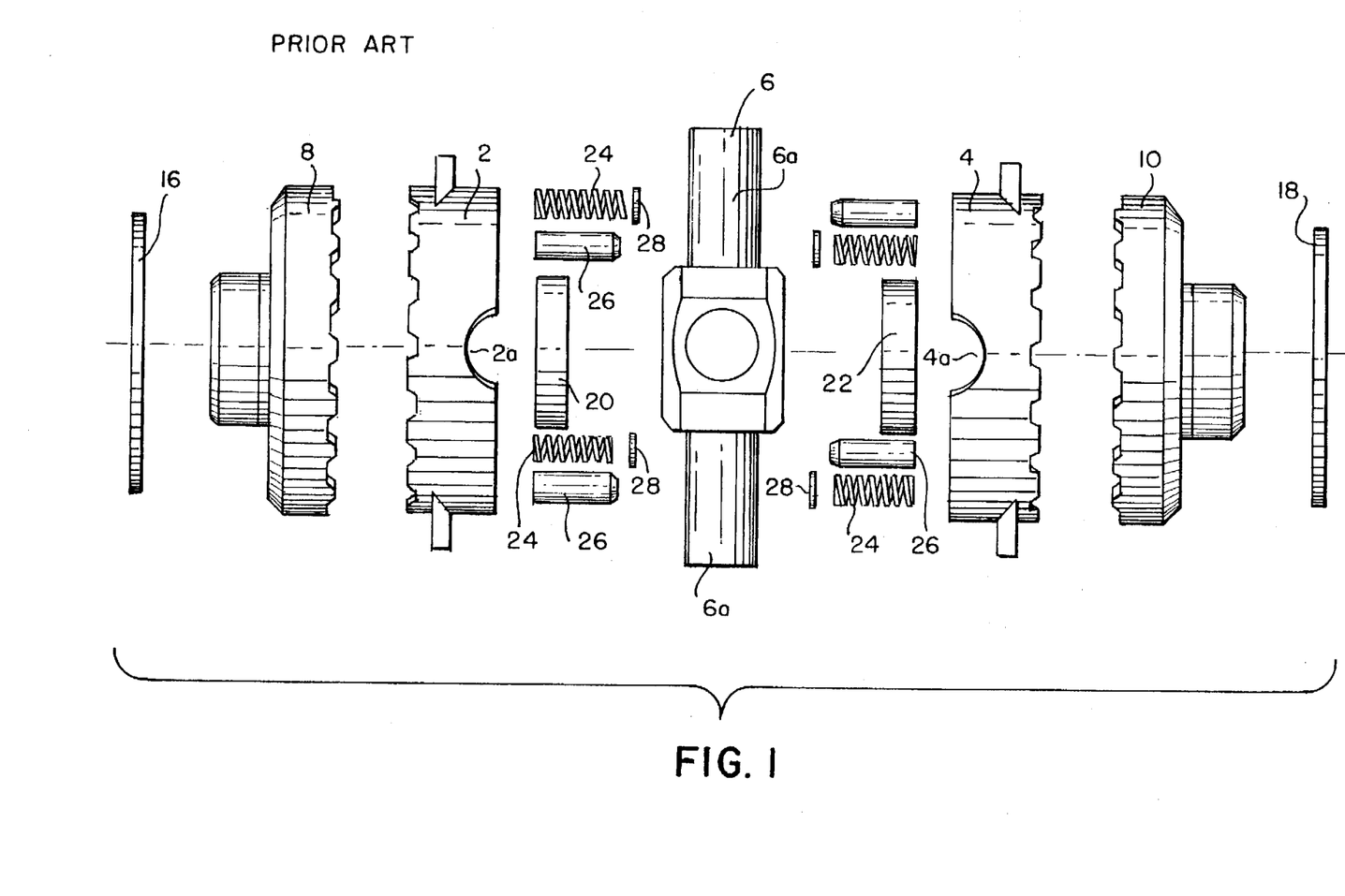
FIG. 1 is an exploded view of a first locking differential embodiment of the prior art.
Figure 2:
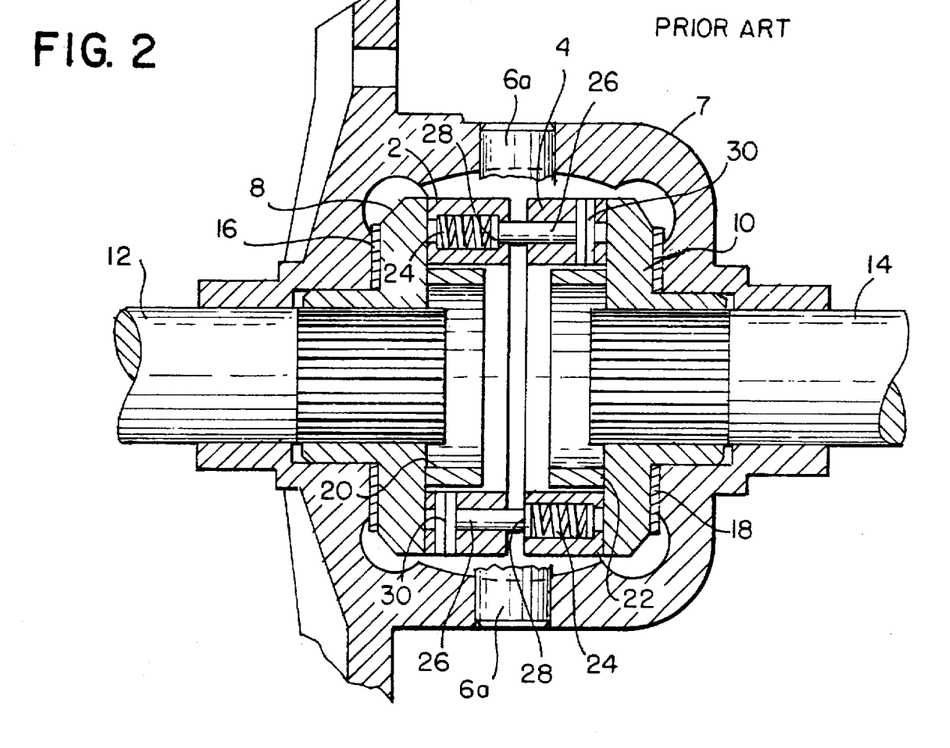
FIG. 2 is a longitudinal sectional view of a modification of the embodiment of FIG. 1.
Figure 3:
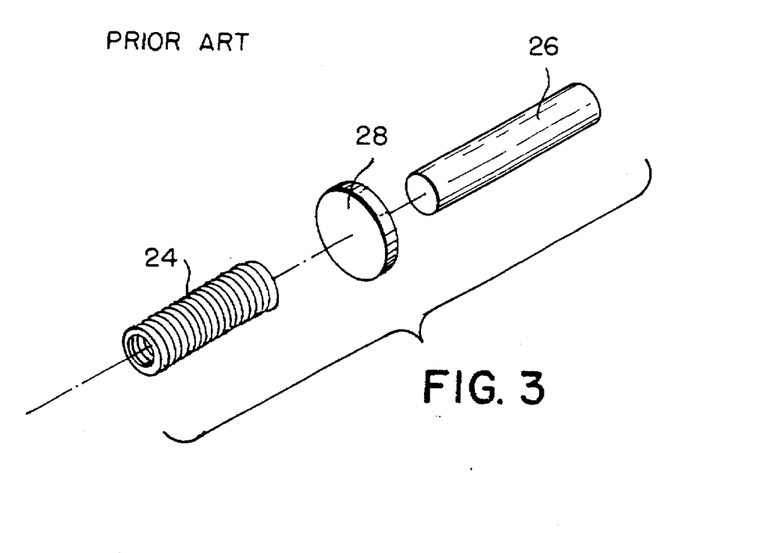
FIG. 3 is an exploded view of the single-spring, disc and locking pin biasing assemblies of the locking differential embodiments of FIGS. 1 and 2.

Referring first to FIGS. 1–3, the early ALL-TRAC and LOCK-RIGHT locking differentials include a pair of annular clutch or coupling members 2 and 4 having diametrically arranged oversized grooves 2a and 4a for receiving the orthogonally arranged arms 6a of central drive rod member 6, the ends of the arms being mounted in differential casing 7. The clutch members 2 and 4 have at their remote ends gear teeth that normally engage corresponding gear teeth on the adjacent ends of side gears 8 and 10 that are splined on the adjacent ends of a pair of output axles or shafts 12 and 14, respectively. Annular thrust washers 16 and 18 are arranged between the side gears 8 and 10 and the adjacent wall surfaces of the casing chamber, and an annular spacer members 20 and 22 are arranged between the side gears and the drive rod 6, respectively. The annular clutch members are biased axially apart toward engaged positions relative to the side gears 8 and 10, respectively, by four biasing assemblies each including a helical spring 24, a locking pin 26, and a spring disc or washer 28 arranged between the adjacent ends of the spring and the pin. At one end, the locking pin is mounted in a corresponding bore contained in one face of a clutch member, and at its other end, the locking pin extends within an oversized spring bore contained in the opposing face of the other clutch member. As shown in FIG. 2, the spring is mounted in the bottom of the oversized spring bore, with the disc being arranged in bearing relation between the adjacent ends of the spring and the pin. Thus, during operation of the locking differential, the oversized spring bore permits lateral sliding movement between the locking pin and the associated spring disc without affecting the spring, and limited angular displacement between the overrunning clutch member and the other clutch member.

In the modification of FIG. 2, as a final step during the assembly of the differential, transverse support pins 30 are mounted in corresponding transverse bores contained in the clutch members, thereby to support the pins at positions to tension the springs to produce the appropriate biasing force on the clutch members.

Figure 4:
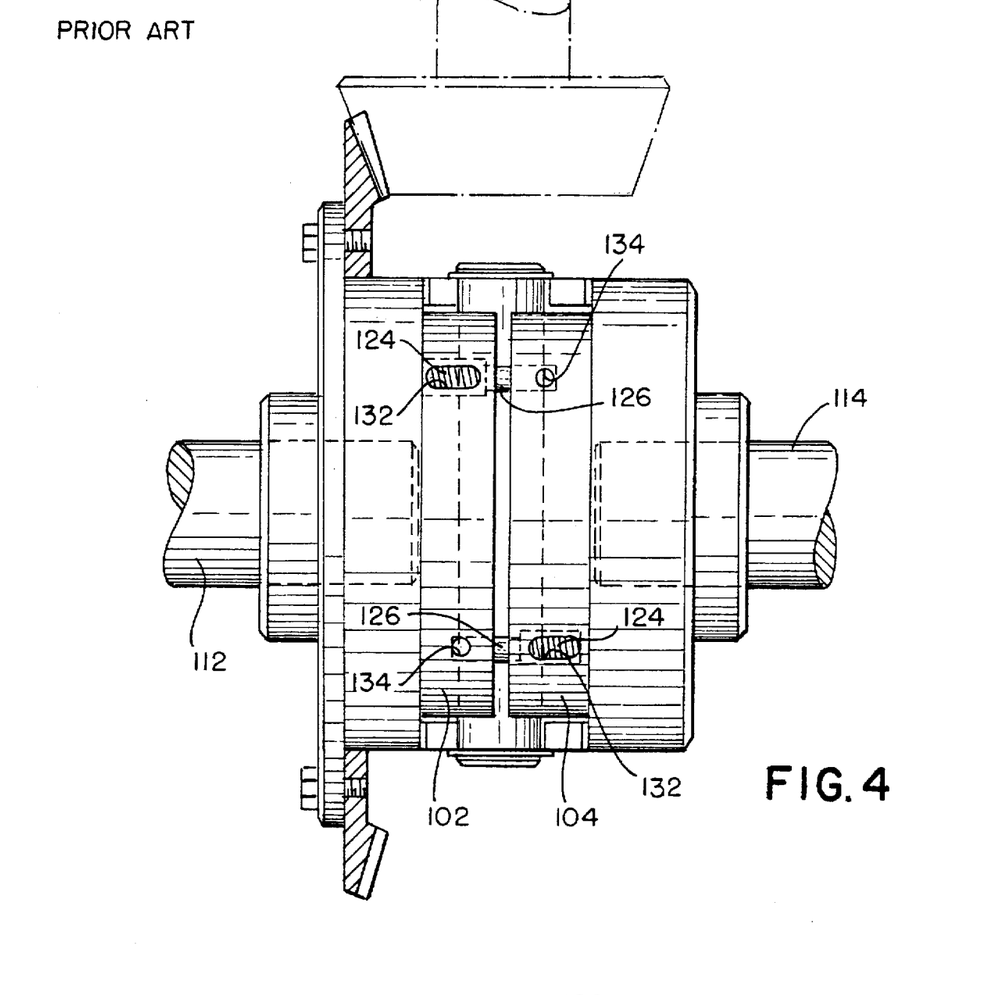
FIG. 4 is a side elevation view of the locking differential of the Zentmyer U.S. Pat. No. 5,413,015.
Figure 5:
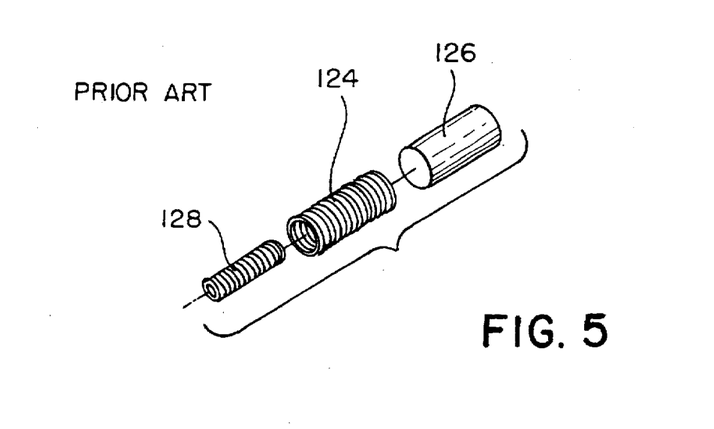
FIG. 5 is an exploded view of the two-concentric-spring biasing arrangement used in the locking differential embodiment of FIG. 4.
Figure 6:
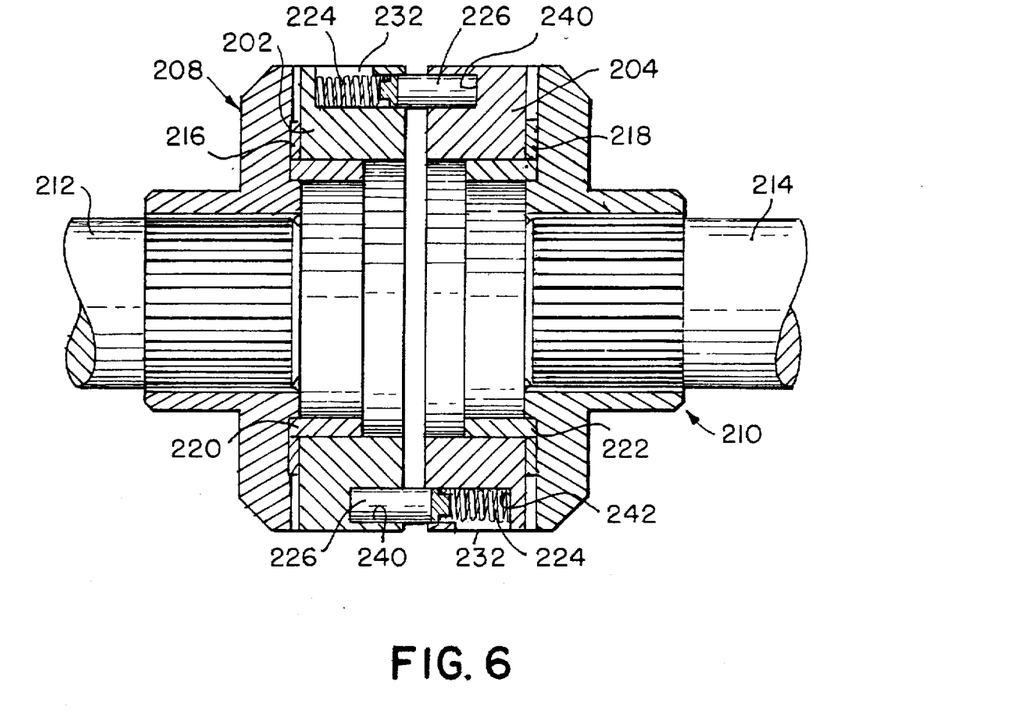
FIG. 6 is a longitudinal sectional view of the locking differential of the present invention.
Figure 13:
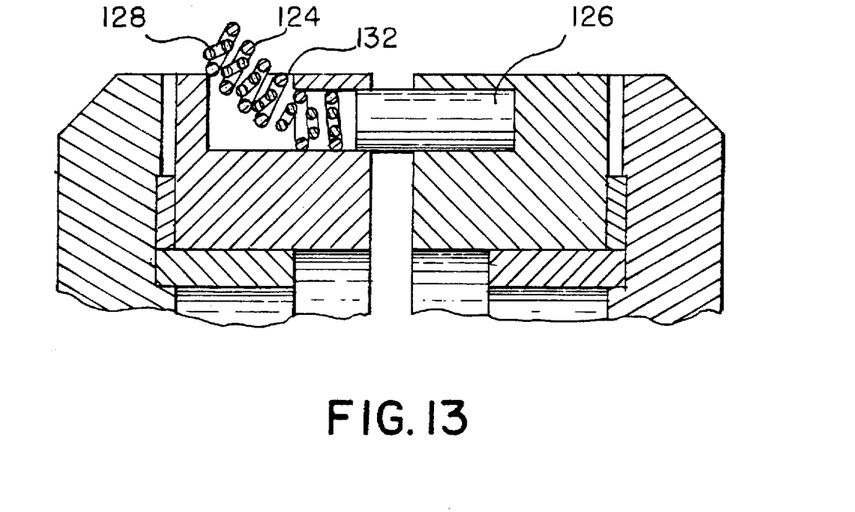
FIG. 13 is a detailed view illustrating the installation of the two-concentric-spring biasing arrangement of FIGS. 4 and 5.
Figure 14:
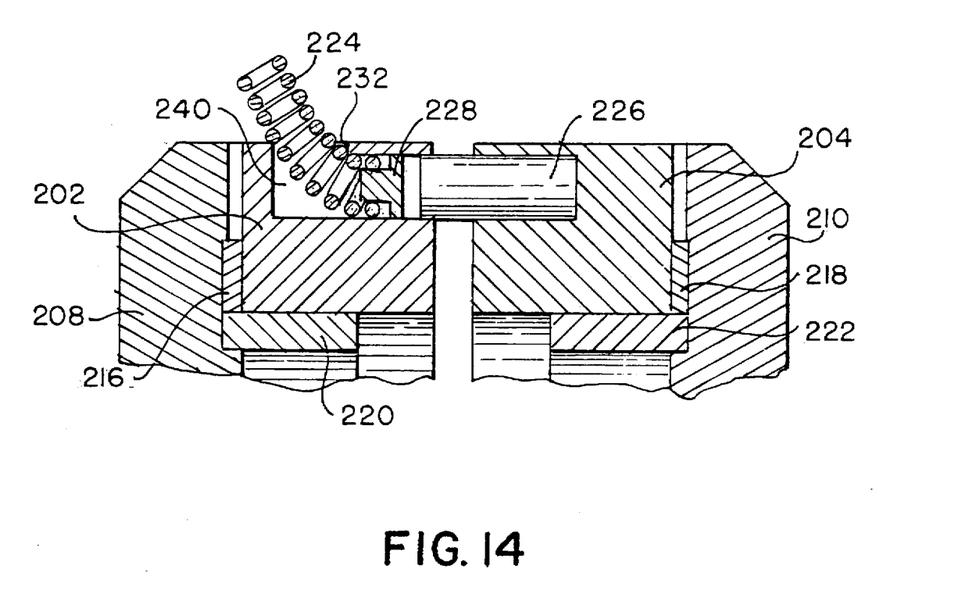
FIGS. 14 and 15 are detailed views illustrating the installation of the spring and spring cap biasing means of the present invention.
Figure 15:
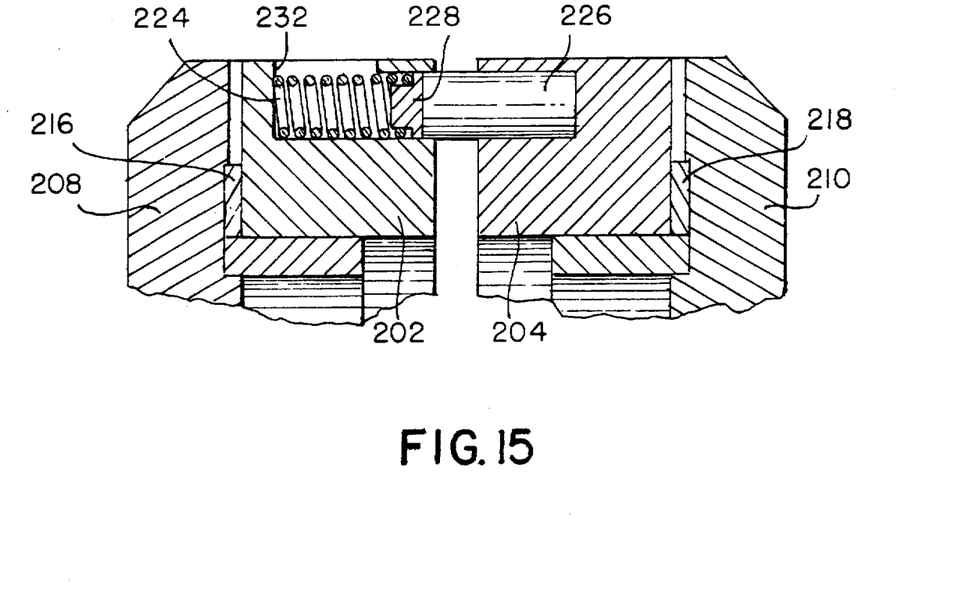

Referring now to FIGS. 4 and 5, in the two-concentric-spring embodiment of the Zentmyer U.S. Pat. No. 5,413,015, the spring disc 28 of the differentials of FIGS. 1–3 is replaced by a second smaller helical spring 128 that is loosely arranged concentrically within the outer spring 124. Thus, in accordance with a characterizing feature of this embodiment, both springs 124 and 128 are in bearing engagement at one end with the adjacent end of the associated locking pin. One clutch member 102 contains a radial spring access opening 132 communicating with the oversized spring bore, and the other clutch member 104 contains a radial pin access opening 134 communicating with the pin bore. The spring access opening 132 has a width that is greater than the outer diameter of the outer spring 124, thereby to permit insertion of the two concentric springs within the spring bore via the spring access opening 132, as will be described below with reference to FIG. 13.

Figure 11:
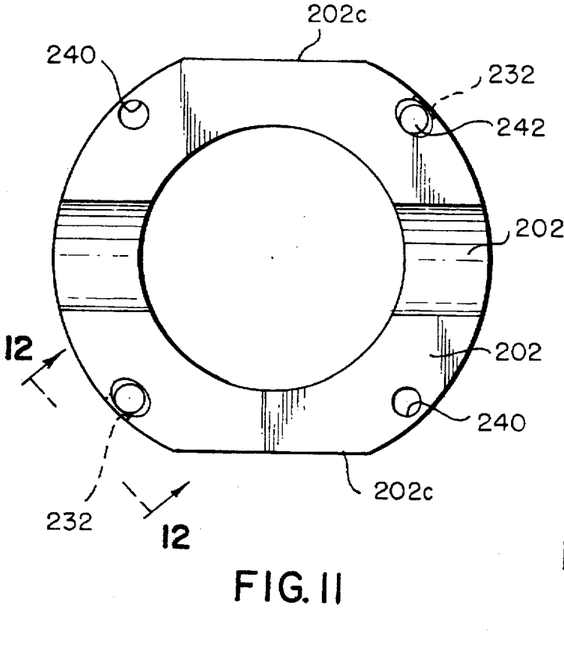
Figure 12:
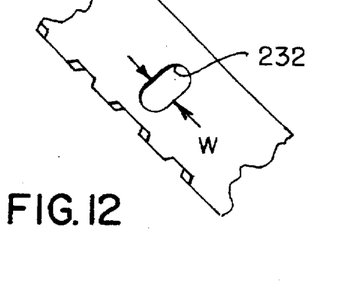
FIG. 12 is a detailed view taken along line 12—12 of FIG. 11.

In accordance with the present invention illustrated in FIGS. 6–12, the spring biasing means comprises four spring assemblies each consisting of a helical spring 224, and a spring cap 228 mounted on and carried by one end of the spring, the spring cap including a disc portion 228a in bearing engagement between the adjacent ends of the spring 224 and the locking pin 226, and a cylindrical plug portion 228b that extends with a friction fit within the adjacent end of the spring. The spring cap disc portion 228a has a diameter that is greater than the outer diameter of the spring, whereby the spring bears solely against the cap disc portion 228a and is isolated from, and never bears against, the adjacent end of the pin 226. The locking pins 226 are mounted at one end within corresponding diametrically arranged pin bores 240 contained in the opposed faces of the clutch members 202 and 204, the free ends of the pins extending within the diametrically arranged oversized spring bores 242 in the bottoms of which the springs 224 are mounted. As best shown in FIG. 11, each clutch member is provided with two pin bores 240 and with two orthogonally-arranged spring bores 242. In the embodiment of FIG. 11, the spring bores have an oblong cross-sectional configuration to permit lateral movement of the pins relative to the associated cap disc portions 228a during the slight angular relative displacement of the clutch members which occurs when one output shaft is in an overrunning condition relative to the other. The clutch members are provided with flat portions on their outer peripheries (such as the flat portions 202c of FIG. 11) to permit retrofit introduction of the clutch members into the consumer's differential casing via the lateral access opening contained therein.

The diameter of the cap disc portion 228a is also less that the width w (FIG. 12) of the spring access opening 232, whereby during the assembly of the differential, the spring and cap biasing assembly is introduced cap-end-first within the spring bore 240 via the radially-extending spring access opening 232. According to one advantage of the invention, owing to the friction fit between the cap plug portion 228b and the spring 224, the cap is maintained captive with and is carried by spring 224 during assembly of the differential, thereby assuring proper orientation of the disc portion 228a of the cap, as well as the loss of the cap. According to a second advantage, since the assembly includes only a single spring, the assembly has a greater lateral bending flexibility than the prior two-concentric-spring embodiment of FIG. 13, thereby simplifying the assembly procedure while reducing manufacturing cost.

Figures 7, 8:
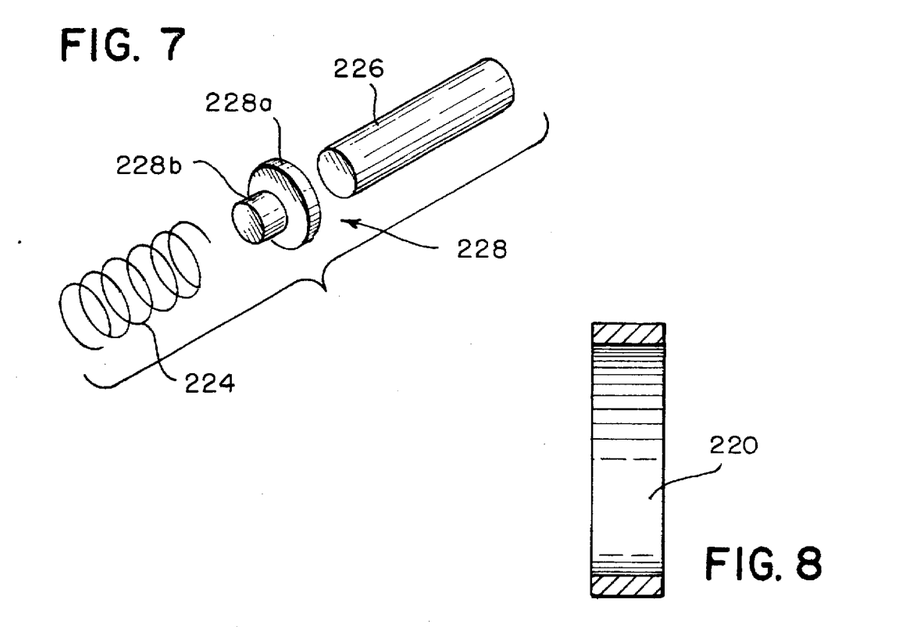
FIG. 7 is an exploded view of on of the spring biasing assemblies of FIG. 6.
FIG. 8 is a longitudinal sectional view of the spacer member of FIG. 6.
Figure 9:
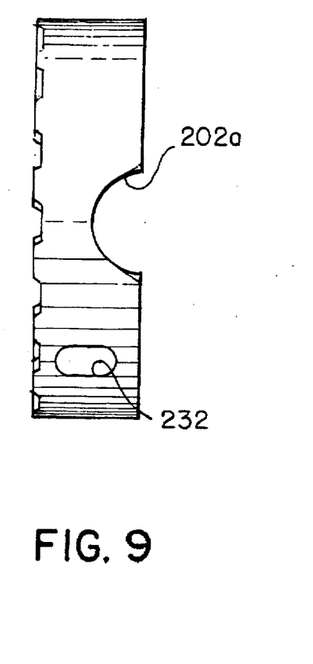
FIG. 9 is a side elevation of one of the clutch members of FIG. 6.
Figure 10:
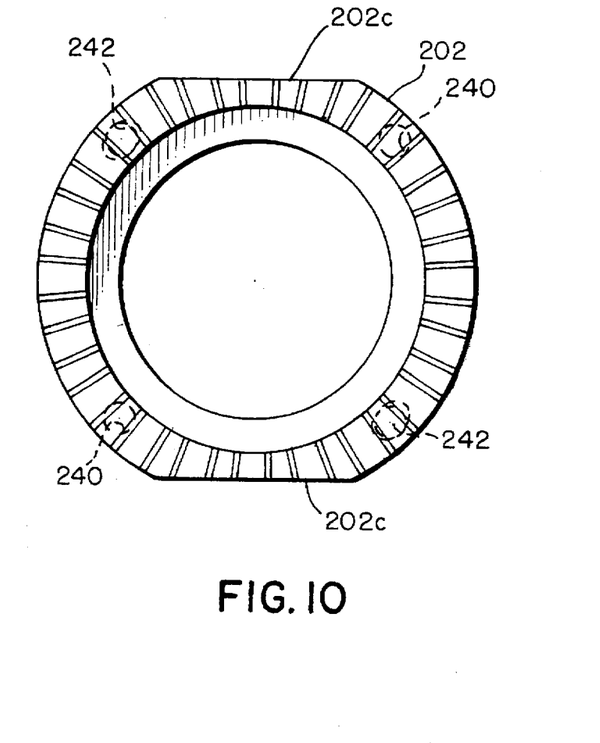
FIGS. 10 and 11 are left and right end views, respectively, of the clutch member of FIG. 9.
Figure 16:
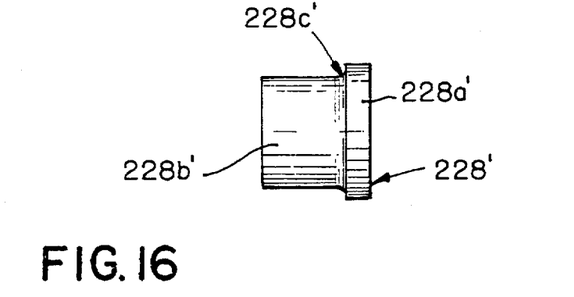
FIGS. 16 and 17 are detailed views of a spring cap of the present invention.
Figure 17:
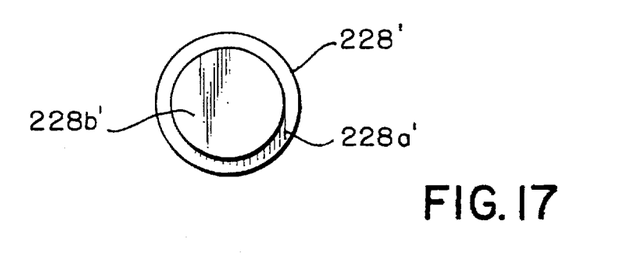

Although the cap plug portion 228a of FIG. 7 has been illustrated as having the configuration of a right cylinder, in the preferred embodiment of FIGS. 16 and 17, the junction 228c' between the plug portion 228b' and the disc portion 228a' has a given radius of curvature for achieving the desired tight fit between the spring and the plug portion 228b'.

While in accordance with the provisions of the Patent Statutes the preferred forms and embodiments of the invention have been illustrated and described, it will be apparent that other changes and modifications may be made without deviating from the inventive concepts set forth above.

What is claimed is:

1. A locking differential for driving a pair of collinearly-arranged axially-spaced output shafts the adjacent ends of which extend through aligned shaft openings contained in the opposed walls of a hollow differential casing, said casing containing an access opening affording access to the casing chamber, comprising:

(a) a pair of generally annular collinearly-arranged axially-spaced clutch members adapted for insertion within the casing chamber via the casing access opening to axially spaced positions between, and collinearly aligned relative to the axis of, the casing shaft openings, respectively, the adjacent opposing faces of said clutch members containing at least one pair of diametrically arranged drive grooves;

(b) a pair of generally annular side gears collinearly arranged with, and on opposite sides of, said clutch members, said side gears being internally splined for non-rotatable connection with the output shafts, respectively, said side gears and said clutch members having adjacent faces provided with cooperating clutch teeth, respectively, said clutch members being axially displaceable inwardly and outwardly toward disengaged and engaged positions relative to said side gears, respectively;

(c) a diametrically extending drive rod arranged between said clutch members and extending within said drive grooves, respectively, the remote ends of said drive rod extending radially outwardly beyond said clutch members for connection with said differential casing, the width of said drive grooves being greater than the diameter of said drive rod;

(d) spacer means limiting the extent of axial inward displacement of said side gears relative to said drive rod;

(e) locking means limiting the extent of angular rotational displacement of said clutch member relative to each other, said locking means including a plurality of locking pins each having a first end mounted in a bore contained in the face of one clutch members adjacent the other clutch member, and a second end extending within an oversized bore contained in the adjacent face of said other clutch member; and (f) spring means biasing said clutch members axially apart toward said engaged position, said spring means including a plurality of spring assemblies mounted in said oversized bores, respectively, each of said spring assemblies consisting of:

(1) a helical spring arranged in said spring bore, said spring having a first end adjacent the bottom end of said spring bore and a second end adjacent a spaced from the adjacent end of the associated locking pin; and (2) a spring cap mounted on said spring second end for isolating said spring from said locking pin, said spring cap including:

(a) a circular disc portion having a diameter at lease as great as the outer diameter of said spring, said disc portion extending between, and having remote first and second faces in engagement with, said spring and said locking pin, respectively, said spring second end bearing solely against said cap disc portion; and (b) a central plug portion extending coaxially within said spring end;

(c) said clutch member containing said oversized bore also containing in its outer periphery a radially inwardly directed spring access opening communicating with said oversized bore, the width of said spring access opening being greater than the diameter of said cap disc portion, whereby said spring with said cap member mounted thereon may be introduced cap-end-first into said oversized bore via said spring access opening.

2. A locking differential as defined in claim 1, wherein said cap plug portion has an outer periphery at least a portion of which is in frictional engagement with the inner circumference of said helical spring.

3. A locking differential as defined in claim 2, wherein the diameter of said plug portion is progressively reduced in the direction away from said disc portion.

4. A locking differential as defined in claim 1, wherein said cap plug portion has the configuration of a right cylinder.

* * * * *